United States Patent

Simons et al.

[11] Patent Number: 6,044,222
[45] Date of Patent: Mar. 28, 2000

[54] SYSTEM, METHOD, AND PROGRAM PRODUCT FOR LOOP INSTRUCTION SCHEDULING HARDWARE LOOKAHEAD

[75] Inventors: Barbara Bluestein Simons, Palo Alto, Calif.; Vivek Sarkar, Newton, Mass.

[73] Assignee: International Business Machines Corporation, Armonk, N.Y.

[21] Appl. No.: 08/882,724

[22] Filed: Jun. 23, 1997

[51] Int. Cl.[7] ........................................................ G06F 9/44
[52] U.S. Cl. ........................ 395/709; 395/706; 712/237; 712/207; 712/238; 712/241; 712/233
[58] Field of Search ................................... 395/709, 705, 395/706; 712/237, 238, 239, 241, 233, 207, 206

[56] References Cited

U.S. PATENT DOCUMENTS

| | | | |
|---|---|---|---|
| 4,435,756 | 3/1984 | Potash | 712/237 |
| 4,714,994 | 12/1987 | Oklobdzija et al. | 712/207 |
| 4,894,772 | 1/1990 | Langendorf | 712/240 |
| 4,984,154 | 1/1991 | Hanatani et al. | 712/240 |
| 5,040,107 | 8/1991 | Duxbury et al. | 712/216 |
| 5,121,473 | 6/1992 | Hodges | 712/240 |
| 5,127,093 | 6/1992 | Moore, Jr. | 712/217 |
| 5,168,557 | 12/1992 | Shibuya | 712/207 |
| 5,201,057 | 4/1993 | Uht | 712/18 |
| 5,202,975 | 4/1993 | Rasbold et al. | 709/305 |
| 5,202,993 | 4/1993 | Tarsy et al. | 395/705 |
| 5,287,466 | 2/1994 | Kodama | 712/206 |
| 5,291,615 | 3/1994 | Okamoto | 712/23 |
| 5,307,478 | 4/1994 | Rasbold et al. | 395/500.43 |
| 5,317,702 | 5/1994 | Morisada | 712/207 |
| 5,317,734 | 5/1994 | Gupta | 395/706 |
| 5,386,562 | 1/1995 | Jain et al. | 395/709 |
| 5,394,529 | 2/1995 | Brown, III et al. | 712/240 |
| 5,394,530 | 2/1995 | Kitta | 712/240 |
| 5,574,939 | 11/1996 | Keckler et al. | 712/24 |
| 5,867,683 | 2/1999 | Witt et al. | 712/218 |
| 5,887,174 | 3/1999 | Simons et al. | 395/709 |

OTHER PUBLICATIONS

Coffman, E. G. and Graham, R. L., "Optimal Scheduling for Two–Processor Systems", Acta Informatica, 1:200–213, 1972.

Ullman, J., "NP–Complete Scheduling Problems", J. Comput. System Sci, 10, pp. 384–393, 1975.

Gabow, H., "Scheduling UET Systems on Two Uniform Processors and Length Two Pipelines", SIAM J. Computing, 17:810–829, 1988.

Hu, T. C., "Parallel Sequencing and Assembly Line Operations", Operations Research, 9:841–848, 1961.

Graham, R., "Bounds for Certain Multiprocessor Anomalies", Bell System Technical Journal, 45, pp. 1563–1581, 1966.

(List continued on next page.)

Primary Examiner—Tariq R. Hafiz
Assistant Examiner—Tuan Q. Dam
Attorney, Agent, or Firm—Prentiss W. Johnson

[57] ABSTRACT

Improved scheduling of instructions within a loop for execution by a computer system having hardware lookahead is provided. A dependence graph is constructed which contains all the nodes of a dependence graph corresponding to the loop, but which only contains loop-independent dependence edges. A start node simulating a previous iteration of the loop may be added to the dependence graph, and an end node simulating a next iteration of the loop may also added to the dependence graph. A loop-independent edge between a source node and the start node is added to the dependence graph, and a loop-independent edge between a sink node and the end node is added to the dependence graph. Loop-carried edges which satisfy a computed lower bound on the time required for a single loop iteration are eliminated from a dependence graph, and loop-carried edges which do not satisfy the computed lower bound are replaced by a pair of loop-independent edges. Instructions may be scheduled for execution based on the dependence graph.

21 Claims, 9 Drawing Sheets

OTHER PUBLICATIONS

Leung, J. Y. T., Vornberger, O., and Witthoff, J., "On Some Variants of the Bandwidth Minimization Problem", SIAM J. Computing, 13:650–667, 1984.

Bruno, J., Jones III, J. W., and So, K., "Deterministic Scheduling with Pipelined Processors", IEEE Trans., pp. 308–316, 1980.

Bernstein, D. and Gertner, I., "Scheduling Expressions on a Pipelined Processor with a Maximal Delay of One Cycle", ACM Trans. on Programming Languages and Systems, 11(1):57–66, Jan. 1989.

Palem, K. V., and Simons, B., "Scheduling Time–Critical Instructions on RISC Machines", Transactions on Programming Languages (TOPLAS), 15, No. 4, pp. 632–658, 1993.

Lawler, E., Lenstra, J. K., Martel, C., Simons, B., and Stockmeyer, L., "Pipeline Scheduling: A Survey", Technical Report RJ 5738, IBM Research, Jul. 1987.

Ebcioglu, K., "A Compilation Technique for Software Pipelining of Loops with Conditional Jumps", Proc. of the 20th Annual ACM Workshop on Microprocessing, pp. 69–79, Dec. 1987.

Warren, H., "Instruction Scheduling for the IBM RISC System/6000 Processor", IBM J. Research and Development, pp. 85–92, 1990.

Bernstein, D. and Rodeh, M., "Global Instruction Scheduling for Superscalar Machines", SIGPLAN91, pp. 241–255, 1991.

Fisher, J. A., "Trace Scheduling: a Technique for Global Microcode Compaction", IEEE Trans. on Computers, C–30(7):478–490, Jul. 1981.

Hennessy, J. and Gross, T., "Postpass Code Optimization of Pipeline Constraints", ACM Trans. on Programming Languages and Systems, 5(3) :422–448, Jul. 1983.

Gibbons, P. B. and Muchnick, S. S., "Efficient Instruction Scheduling for a Pipelined Architecture", Proc. SIGPLAN'86 Symp. on Compiler Construction, pp. 11–16, Jun. 1986, Published as SIGPLAN Notices vol. 21, No. 7.

Auslander, M. and Hopkins, M., "An Overview of the PL.8 Compiler", Proc. SIGPLAN '82 Symp. on Compiler Construction, pp. 22–31, Jun. 1982, Published as SIGPLAN Notices vol. 17, No. 6.

Palem, K. V., and Simons, B., "Instruction Scheduling for Compilers", IBM Research Report 8535, Dec., 1991.

Bernstein, D., Rodeh, M. and Gertner, I., "Approximation Algorithms for Scheduling Arithmetic Expressions on Pipelined Machines", J. of Algorithms, 10:120–139, Mar. 1989.

Bernstein, D., Cohen D., Lavon, Y. and Raimish V., Performance Evaluation of Instruction Scheduling on the IBM RISC System/6000, SIGMICRO Newsl. (USA), vol. 23, No. 1–2, Dec. 1992, p. 226–235.

Leung et al, "Run–time versus compile–time instruction scheduling in superscalar (RISC) processors: performance and tradeoffs," Proceedings of the 3rd International Conference on High Performance Computing Dec. 1996, pp. 215–224.

Boo et al, "High–speed Viterbi decoder: an efficient scheduling method to exploit the pipelining," ASAP 96, Proceedings of International Conference on Application Specific Systems, Architectures and Processors, pp. 165–174, Aug. 1996.

Chen et al, "Performance evaluation of buffered multistage interconnection networks with look–ahead contention resolution scheme," ICC '95 Seattle, 'Gateway to Globalization', Jun. 1995 IEEE International Conference on Communications, vol. 2, pp. 1137–1141.

Barrado et al, "An efficient Scheduling for Doacross Loops," Proceedings of the Sixth IASTED/ISMM International Conference on Parallel and Distributed Computing and Systems, Washington DC, USA, Oct. 3–5, 1994, pp. 303–307.

Wang et al, "Decomposed Software Pipelining with Reduced register Requirement," Proceedings of the IFIP WG10.3 Working Conference PACT '95 on Parallel Architecture and Compilation Techniques, Laxenburg, Austria, Jun. 27–29, 1995, pp. 277–280.

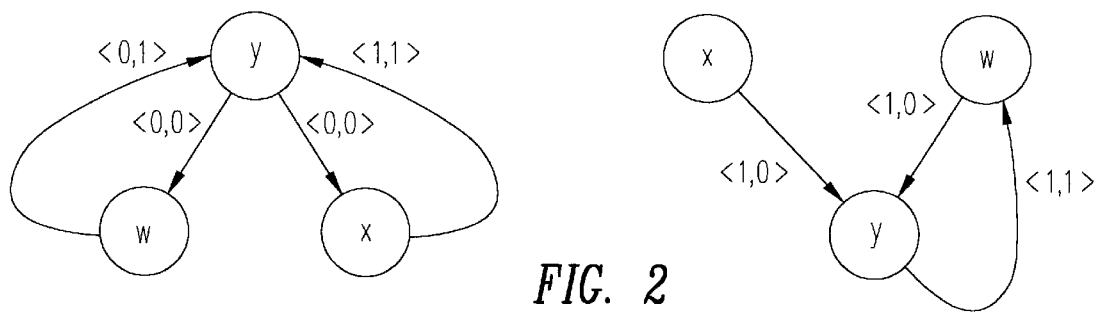
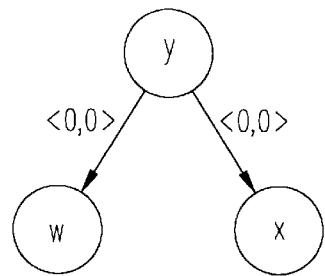
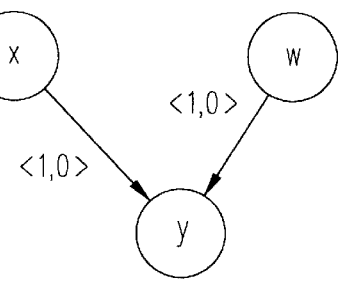
FIG. 2
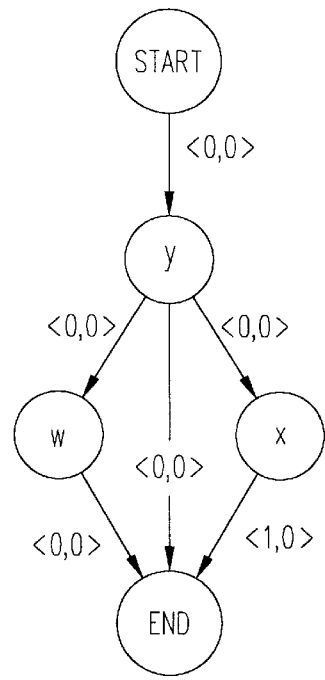
FIG. 3
FIG. 4

Schedule S2 = y x w y x w . . .
(makespan = 3N cycles)

Schedule S2 = x w  y x w  y . . .
(makespan = 4N cycles)

FIG. 5

Schedule S1 = y w x  y w x . . .
(makespan = 4N − 1)

Schedule S1 = w x  y  w x  y . . .
(makespan = 5N − 1 cycles)

FIG. 6

SYSTEM, METHOD, AND PROGRAM PRODUCT FOR LOOP INSTRUCTION SCHEDULING HARDWARE LOOKAHEAD

BACKGROUND OF THE INVENTION

1. Field of the Invention

This invention relates to the field of computer systems, and more particularly to scheduling loop instructions for execution by a computer system having hardware lookahead.

2. Description of the Related Art

Modelling a Basic Block as a Graph

A basic block is a contiguous sequence of instructions such that control flow can only enter at the first instruction and leave at the last instruction. Basic blocks have the characteristic that if one of the instructions is ever executed by the program, all the instructions in the basic block will be executed (assuming that no exceptions occur). A basic block typically starts at a branch label and is typically terminated by some sort of branch instruction.

If instruction a must be executed prior to instruction b for program correctness, e.g., an action (for example, memory fetch) or computation performed by instruction a is used by instruction b, then there is a dependence from a to b. Instruction scheduling may be performed by a compiler or by processor hardware to reorder instructions without violating any dependencies so as to obtain the fastest possible execution of the computer program. Instruction scheduling must take into account restrictions that are associated with instructions, such as inter-instructional latencies (hereinafter referred to simply as latencies). Latency is present when there is an enforced delay between instruction a and instruction b, where instruction b depends on instruction a. For example, if instruction a loads some value from memory, and instruction b uses that value in a computation, then the delay caused by the memory access is modelled as a latency from a to b.

Because of dependencies between pairs of instructions in a basic block, the instruction scheduler utilizes a dependence graph to model the basic block. A dependence graph is a directed multigraph. A multigraph is a set of nodes and edges, with an edge consisting of a pair of nodes. In a multigraph, there may be multiple edges connecting the same pair of nodes. In a directed multigraph each edge has a direction, i.e. edge (u,v) is directed from node u to node v, whereas edge (v,u) is directed from node v to node u. An instruction is represented as a node, and a dependence from u to v as a directed edge (u,v). A latency from u to v is represented as a weight on the edge (u,v). A graph is acyclic if it does not contain any cycles, i.e., if there is no path in the graph that can start at a node and get back to that node by following a sequence of adjacent edges through the graph. An acyclic dependence graph is also referred to as a directed acyclic graph (DAG).

The Multiple Machine Scheduling Model

A problem that has been extensively studied involves scheduling a DAG on a set of m identical functional units or processors within a computer system or data processing system. In other words, an instruction may be scheduled on any of the functional units in the target computer system. The goal is to compute a schedule of instructions in which the last instruction to complete execution finishes as early as possible, while not violating any of the precedence constraints of the DAG. Such a schedule requiring a minimum number of overall cycles is referred to as an optimal schedule or minimum completion time schedule or minimum makespan.

A method is polynomial time if there is some polynomial that takes the size of the problem as input and that computes an upper bound on the number of steps required by the method. Problems for which polynomial time methods exist are considered to be computationally tractable. By contrast, NP-complete or NP-hard problems are generally regarded as being computationally intractable. Although much work has been done on NP-complete and NP-hard problems, there is no known polynomial time method for constructing an optimal solution for any of these problems; it is conjectured that all these problems may require exponential time to solve in the worst case. However, because these categorizations are based on constructing optimal solutions, it is frequently possible to develop efficient methods or techniques for constructing good, if not necessarily optimal, solutions by using heuristics that do not guarantee optimality. One approach that is used is to develop a polynomial time optimal method for a simplified version of the problem one wishes to solve, and then to use that method to get a good solution for the actual problem. Most scheduling problems are NP-hard. Below the major instruction scheduling results are reviewed.

A number of scheduling problems that are NP-hard become computationally tractable if all instructions have unit execution time. The results in this paragraph all assume unit execution time. A polynomial time method for constructing an optimal schedule for the two identical processor scheduling problem was first obtained in 1972 by Coffman, E. G. and Graham, R. L., "Optimal Scheduling for Two-Processor Systems", Acta Informatica, 1:200–213, 1972. In 1975, the problem of constructing an optimal schedule for an arbitrary number of identical processors was shown to be NP-complete by Ullman, J., "NP-Complete Scheduling Problems", J. Comput. System Sci, 10, pages 384–393, 1975. Subsequently, Gabow, H., "Scheduling UET Systems on Two Uniform Processors and Length Two Pipelines", SIAM J. Computing, 17:810–829, 1988, developed a faster "highest-level-first" method for the two identical processors scheduling problem. Whether or not it is possible to construct an optimal schedule in polynomial time for the three-processor scheduling problem is a major open problem. If the DAG is restricted to a forest of in-trees or a forest of out-trees (an in-tree is a tree in which each node has at most one successor, and an out-tree is a tree in which each node has at most one predecessor), then the method of Hu, T. C., "Parallel Sequencing and Assembly Line Operations", Operations Research, 9:841–848, 1961, constructs an optimal schedule in polynomial time for an arbitrary number of identical processors.

A greedy schedule is one in which the machine is never left with nothing to do if there is some instruction that could be scheduled. In 1966, Graham, R., "Bounds for Certain Multiprocessor Anomalies", Bell System Technical Journal, 45, pages 1563–1581, 1966, showed that any scheduling heuristic is guaranteed to come within a factor of two of the optimal completion time for the m-scheduling problem, where m is the number of processors.

Pipeline Scheduling for Unit Execution Times

The Coffman-Graham approach can be adapted to optimally schedule a single two stage pipeline processor, see Leung, J. Y. T., Vornberger, O., and Witthoff, J., "On Some Variants of the Bandwidth Minimization Problem", SIAM J. Computing, 13:650–667, 1984. Gabow has shown that his method for two-processor scheduling generalizes to the case of an arbitrary DAG and a single pipeline with two stages. It is also straightforward to modify Hu's technique so that it can optimally schedule a forest of in-trees or a forest of out-trees on a set of m identical pipelines, each of which has precisely k stages, see Bruno, J., Jones III, J. W., and So, K., "Deterministic Scheduling with Pipelined Processors", IEEE Trans., pages 308–316, 1980.

Scheduling With 0/1 Latencies

Edge (u,v) has latency k if instruction v must wait k units after the completion of instruction u before it can begin execution. An edge has latency 0 if there is no required delay. Bernstein et al., Bernstein, D. and Gertner, I., "Scheduling Expressions on a Pipelined Processor with a Maximal Delay of One Cycle", ACM Trans. on Programming Languages and Systems, 11(1):57–66, January 1989, developed a method for constructing an optimal schedule for a problem with an arbitrary DAG, unit execution time per instruction, and latencies of 0 and 1. The Rank Method, developed by Palem et al., Palem, K. V., and Simons, B., "Scheduling Time-Critical Instructions on RISC Machines", Transactions on Programming Languages (TOPLAS), 15, No. 4, pages 632–658, 1993, also constructs an optimal schedule for scheduling an arbitrary DAG with unit execution times and latencies of 0 and 1 on a single processor. In addition, the Rank Method constructs a minimum tardiness (the amount by which any instruction fails to meet its deadline) schedule if the problem input has deadlines. Palem et al. have demonstrated that any greedy heuristic will construct a schedule that is within a factor of two of an optimal schedule for the problem of scheduling a DAG with arbitrary latencies on m processors.

Equivalence of the Different Models for Unit Execution Time

A latency scheduling problem in which all edges have the same latency k and instructions all have unit execution times is equivalent to a (k+1)-stage pipeline scheduling problem. The reason that latencies are k, but the pipelines have (k+1) stages is that instructions in the latency problem all require a single unit of execution time, independent of the latencies. Leung et al. shows that the k+1 stage pipeline problem is at least as hard as the k-machine scheduling problem when the input is an arbitrary DAG. Therefore, the problem of constructing an optimal schedule for a 4-stage pipeline problem or a problem in which the latencies are all equal to 3 is at least as hard as the three-machine scheduling problem. Although it is not known whether or not a polynomial time method exists for constructing minimum completion time schedules for problem instances in which the latencies are bounded above by some constant greater than one, it is known that the problem becomes NP-hard if the latencies can be arbitrarily large. Finally, even if the processor has only a single register, all the latencies are 1, and the DAG is a set of chains or threads, constructing an optimal schedule becomes NP-hard, see Palem et al.

The Assigned Processor Model

The assigned processor model most closely approximates the multiple functional unit processors that are being produced today. In the assigned processor model, an instruction must be scheduled on a particular functional unit, or perhaps on one of several functional units of a particular type. Unfortunately, this problem is very difficult to solve optimally. Lawler, E., Lenstra, J. K., Martel, C., Simons, B., and Stockmeyer, L., "Pipeline Scheduling: A Survey", Technical Report RJ 5738, IBM Research, July 1987, shows that constructing an optimal schedule is NP-complete, even if the DAG is only a set of chains or threads, and if instructions are all unit length and have to be placed on one of only two non-pipelined processors with only zero latencies. Lawler et al. also contains a negative result that shows that a highest level first (greedy) heuristic can perform very poorly when scheduling an arbitrary DAG on a set of identical pipeline processors. A VLIW (Very Long Instruction Word) machine can be considered to be a special case of an assigned processor (for an example, see Ebcioglu, K., "A Compilation Technique for Software Pipelining of Loops with Conditional Jumps", Proc. of the 20th Annual ACM Workshop on Microprocessing, pages 69–79, December 1987.).

Compiler-Related Results

The Warren heuristic, Warren, H., "Instruction Scheduling for the IBM RISC System/6000 Processor", IBM J. Research and Development, pages 85–92, 1990, which was implemented on the "IBM RISC SYSTEM/6000", ("IBM" and "RISC SYSTEM/6000 are registered trademarks of International Business Machines Corporation.) does greedy scheduling on a prioritized list. Since the Warren heuristic targets both fixed and floating point processors, the heuristic constructs a schedule for a version of the assigned machine scheduling problem. (For example, see Bernstein, D. and Rodeh, M., "Global Instruction Scheduling for Superscalar Machines", SIGPLAN91, pages 241–255, 1991.).

Beyond Basic Blocks

An approach to increasing the scope of instruction schedules beyond basic blocks is to utilize what would otherwise be idle cycles to precompute results, where an idle cycle is one in which a functional unit has no assigned work. This can be done by moving an instruction from a later basic block in the schedule into an idle cycle, so long as executing that instruction earlier has no side effects.

Alternatively, because it's a problem to keep track of instructions from both branches, the compiler can guess which branch of the conditional will be taken. It can then move instructions from that branch that have no side effect into idle cycles that precede the conditional. Such a speculative move is discussed in Bernstein et al. If the compiler guesses correctly, then the idle cycles will have been put to good use.

A different strategy for scheduling across basic blocks involves trace scheduling, Fisher, J. A., "Trace scheduling: A technique for global microcode compaction", IEEE Trans. on Computers, C-30(7):478–490, July 1981. Trace scheduling uses profiling to compute the path through the program graph that is most likely to be taken, and then optimizes for that path.

Software pipelining is a program transformation that has been studied extensively for exposing more instruction-level parallelism within a loop; for example, see the teachings of Ebcioglu. The output of the software pipelining transformation consists of a prolog, epilog, and a new loop which may contain different iteration instances of instructions from the original loop. The goal of software pipelining is to increase the number of independent instructions in the transformed loop body, compared to the original loop. While the software pipelining transformation can create more instruction-level parallelism, it does not strive to further overlap instructions from different iterations of the transformed loop so as to exploit hardware lookahead. Also, in some cases, the increase in code size by software pipelining due to creation of the prolog and epilog sections is unacceptable.

The prior art approaches above have failed to provide optimal scheduling of instructions of a loop containing basic blocks in the presence of hardware lookahead.

Thus, existing methods provide no method of, or apparatus for, optimal scheduling of instructions of a loop containing basic blocks in the presence of hardware lookahead. As such, there is a need for a method of, and apparatus for, providing optimal scheduling of instructions of a loop containing basic blocks in the presence of hardware lookahead.

SUMMARY OF THE INVENTION

All modern processor architectures include some degree of hardware instruction lookahead to support out-of-order instruction dispatch, issue and execution. Instruction lookahead works well in conjunction with hardware branch prediction which enables the lookahead window to be filled with instructions from the basic block that is predicted to be executed next. Instruction lookahead is essential for supporting the increasing levels of instruction-level parallelism present in modern processor architectures (e.g., in the form of multiple pipeline stages or multiple functional units). A simple abstraction of instruction lookahead can be modeled by a lookahead buffer or a lookahead window, capable of storing a fixed number of instructions that can be issued and executed out of order as they become ready for execution. The window moves ahead only when the first instruction in the window has been issued/dispatched.

Past work has focused on exploiting instruction lookahead in the context of scheduling instructions in branch delay slots. The present invention targets a more general lookahead model that is present in modern processors, a lookahead buffer rather than just delay slots in branch instructions. Hardware instruction lookahead does not offer any lookahead advantage over software when scheduling instructions within a single basic block; in this case, the compiler can essentially schedule instructions with complete lookahead. However, hardware instruction lookahead does have an advantage in performance and in safety when scheduling instructions from multiple basic blocks in the presence of statically unpredictable branches. Out-of-order instruction execution in the hardware can also adapt to non-deterministic execution times and dynamic memory disambiguation. The goal of the present invention's instruction scheduling method is to rearrange instructions within each basic block within a loop so that the overall completion time in the presence of hardware instruction lookahead is minimized. The method preserves safety by not moving any instructions beyond basic block boundaries.

The invention disclosed herein comprises a method of, a system for, and an article of manufacture for causing, scheduling of instructions of a loop for execution by a computer system having hardware lookahead.

In accordance with one aspect of this invention, a dependence graph is constructed which contains all the instructions in a loop as nodes of a graph corresponding to the loop, but which contains only loop-independent dependence edges.

In accordance with another aspect of this invention, a node simulating a previous iteration of the loop is added to a dependence graph.

In accordance with another aspect of this invention, a node simulating a next iteration of the loop is added to a dependence graph.

In accordance with another aspect of this invention, a loop-independent edge between a source node and a node simulating a previous iteration of the loop is added to a dependence graph.

In accordance with another aspect of this invention, a loop-independent edge between a node simulating a next iteration of the loop and a sink node is added to a dependence graph.

In accordance with another aspect of this invention, loop-carried edges which satisfy a computed lower bound on the time required for a single loop iteration are eliminated from a dependence graph.

In accordance with another aspect of this invention, each loop-carried edge which does not satisfy a computed lower bound on the time required for a single loop iteration is replaced by a pair of loop-independent edges.

The present invention has the advantage of providing improved instruction scheduling.

The present invention has the advantage of providing improved instruction scheduling for a loop.

The present invention has the further advantage of rearranging instructions within each basic block to reduce the overall completion time of a loop in the presence of hardware instruction lookahead.

The present invention has the further advantage of preserving safety by not moving any instructions beyond basic block boundaries.

The present invention has the further advantage of providing a heuristic for a given lookahead window size and arbitrary latencies.

The present invention has the further advantage of providing improved instruction scheduling when an instruction trace is not known.

The present invention has the further advantage of providing improved instruction scheduling even when an instruction trace prediction does not match a dynamic execution sequence.

The present invention has the further advantage of providing improved instruction scheduling for multiple functional units in the presence of hardware lookahead.

BRIEF DESCRIPTION OF THE DRAWINGS

For a more complete understanding of the present invention and the advantages thereof, reference is now made to the Detailed Description in conjunction with the attached Drawings, in which:

FIG. 2 shows sample programs for a single source example and a single sink example and corresponding dependence graphs G, wherein integer multiply and floating point operations are both assumed to have latencies of 1;

FIG. 3 shows loop independent subgraphs $G_{li}$ corresponding to the sample programs of FIG. 2;

FIG. 4 shows acyclic dependence graphs $G_{SE}$ corresponding to the sample programs of FIG. 2;

FIG. 5 shows minimum completion time schedules for the sample programs of FIG. 2 produced by the practice of the present invention;

FIG. 6 shows schedules for the sample progams of FIG. 2 produced by the practice of the prior art;

DESCRIPTION OF THE PREFERRED EMBODIMENT

A simple model for instruction lookahead is as follows. Let W be the size of the lookahead window. Typical values for W in modern processors are in the range of 2–6. At any given instant, the window contains a sequence of W instructions, say $i_n$, . . . , $i_{n+W-1}$ that occur contiguously in the program's dynamic instruction stream. The processor hardware is capable of issuing and executing any of these W instructions in the window that is ready for execution. The window moves ahead only when the first instruction in the window ($i_n$) has been issued. The present invention addresses the problem of instruction scheduling performed by the compiler in the presence of hardware instruction lookahead.

Scheduling Loops to Optimize for Loop-Carried Dependences

Problem Statement

Given a basic block of m≧1 instructions, $i_l$, . . . , $i_m$ enclosed by a single-exit loop (such as a C WHILE loop or a Fortran DO loop), find an optimal permutation π such that the ordering $i_{\pi(l)}$, . . . , $i_{\pi(m)}$ satisfies all data dependences and minimizes the completion time of the entire loop. The completion time of n iterations of the loop equals the completion time that would be obtained if the loop were completed unrolled i.e. the completion time of the following instruction sequence, $i_{\pi(l)}[1]$, . . . , $i_{\pi(m)}[1]$, $i_{\pi(l)}[2]$, . . . , $i_{\pi(m)}[2]$, . . . , $i_{\pi(l)}[n]$, . . . , $i_{\pi(m)}[n]$, where $i_{\pi(j)}[k]$ denotes the $k^{th}$ iteration instance of the $j^{th}$ instruction in the permuted instruction sequence for the given basic block.

Control dependence from one iteration to the next may be ignored because modern processors can start executing instructions from the next iteration even if the instructions from the previous iteration have not completed.

Examples and Definitions

Consider the following loop:

```
    do i = 1, n
s1      B[i] = A[i – 1] + x;
s2      A[i] = y;
    end
```

Figure 1:
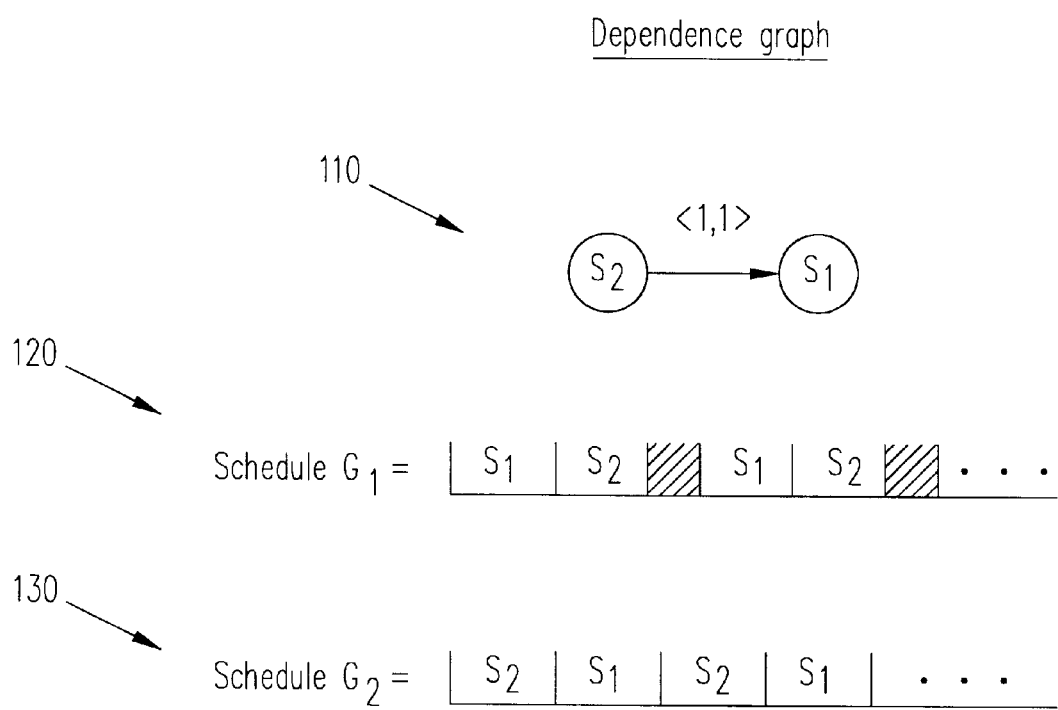
FIG. 1 shows a simple two-statement instruction graph and two schedule permutations thereof.

For simplicity, we will consider a statement (s1 or s2) to be a single instruction when discussing this example. As written, there is a dependence from statement s2 in the i-1$^{st}$ iteration of the loop to statement s1 in the i$^{th}$ iteration of the loop. In other words, the value of B[i] cannot be computed until the value of A[i-1] has been computed. This kind of dependence is called loop-carried, and it is represented as a labeled edge in the dependence graph of the loop. The distance associated with a loop-carried edge is the number of iterations separating the two statements. In the above example, distance=1. In general, distance=0 identifies a loop-independent dependence and distance>0 identifies a loop-carried dependence. Because dependences edges also have associated latencies, each loop-carried edge has edge label<latency, distance>specifying the latency and the distance (in iterations) for the dependence. The data dependence in FIG. 1 is called a flow dependence because the value of A[i] computed by statement s2 in the i-1$^{th}$ iteration is used by (i.e., flows into) the value of A[i-1] used by statement s1 in the i$^{th}$ iteration. A dependence graph may also contain anti (read followed by write) and output (write followed by write) dependences. If (x,y) is a loop-carried edge, x is referred to as the originating node, and y as the target node.

Consider scheduling the instruction graph 110 shown in FIG. 1 on a single functional unit. There are two legal permutations for this graph, G1=<1,2> 120 and G2=<2,1> 130. It is easy to see that schedule G1 will have more idle slots than schedule G2 for this example because the latency of the loop-carried dependence is not overlapped with any computation in G1, but is overlapped with two statements in G2. Using the definition for loop completion time outlined above, we see that schedule G1 has a loop completion time of approximately 3n cycles, and schedule G2 has a loop completion time of approximately 2n cycles, for n iterations (assuming for this example that statements s1 and s2 each take one cycle, and that the loop-carried dependence also has a latency of one cycle).

Constructing a Modified Dependence Graph

Let G be the instruction-level dependence graph of loop L which contains all the loop-carried and loop-independent dependences of L. We show how to construct a modifed dependence graph $G_{SE}$ from G. $G_{li}$ is defined as the subgraph of G that contains all of the nodes of G, but only the loop-independent dependence edges of G.

If there are no loop-carried edges in G, then the method of the present invention sets $G_{SE}$=$G_{li}$, schedules $G_{SE}$, and halts. If there are any loop-carried edges in G, then the method starts the construction of $G_{SE}$ by setting $G_{SE}$ equal to $G_{li}$ together with two "dummy" nodes, START and END. START simulates the previous iteration, and END simulates the next iteration of L.

A source node is a node with no predecessors in G, and a sink node is one with no successors in G. For each source node u, the method adds loop-independent edge (START, u)

with latency zero to $G_{SE}$. For each sink node v, the method adds loop-independent edge (v, END), also with zero latency, to $G_{SE}$. This step guarantees that an entire iteration of L will occur after START and before END when $G_{SE}$ is scheduled. This step is performed by Procedure Process__nodes($G_{SE}$).

In Procedure Process__loop__carried__edges, all loop carried edges that will be satisfied are eliminated, and the other loop carried edges are replaced with representative loop-independent edges. For example, if latencies are only 0/1, a loop-carried dependence edge with distance>1 never introduces a delay because its 0/1 latency is always satisfied (since the basic block has at least one instruction). Hence, the edge can be eliminated from G.

Procedure Process__loop__carried__edges($G_{SE}$) first calls Procedure Loop__lower__bound($G_{SE}$) to compute a lower bound $T_L$ on the time required for a single iteration of loop L. It then processes each loop-carried edge of G. All loop-carried dependence edges that are always satisfied in any feasible schedule are eliminated from G. Each remaining loop-carried dependence edge is represented in $G_{SE}$ as a pair of loop-independent edges with latencies that are derived from the edge weights of the loop-carried dependence edge.

Let (x,y) be a loop-carried edge in G that has not been marked with edge label <k,q>, where k is the latency and q is the distance of (x,y). Edges (START,y) and (x,END) are added to $G_{SE}$. The method first computes $T_1$, a lower bound on the time required between the completion of START and the start of node y. It also computes $T_2$, a lower bound on the time between the completion of node x and END. Both values are computed by Procedure Backschedule(x,D,$G_{li}$). Alternative embodiments may compute less precise lower bounds with smaller compile times. It then tests if k is less than or equal to $T_1+T_2+(q-1)T_L$. If the inequality holds, then the edge may be ignored. The procedure marks (x,y) and checks to see if there are any remaining unmarked loop-carried edges. If the inequality does not hold, it calls Procedure Process__edge((x,y), $T_1$, $T_2$, $G_{SE}$) which adds "representative" edges (START,y) with latency $k_1$ and (x,END) with latency $k_2$ to $G_{SE}$.

When no unmarked loop-carried edges remain in G, the process schedules $G_{SE}$ and halts.

Computing the Schedule

The Basic Method

The basic method computes a schedule for $G_{SE}$ with no further modifications.
1. $G_{li}$ is constructed from G by setting $G_{li}$ equal to a copy of G and removing all backedges from $G_{li}$.
2. If no loop-carried edges remain
   (a) $G_{SE}=G_{li}$
   (b) go to 6.
3. $G_{SE}=G_{li}\cup\{\text{START END}\}$. START and END are distinct from any node in $G_{li}$.
4. For each sink node z in $G_{SE}$, add edge (z, END) with edge label <0,0> to $G_{SE}$. For each source node z in $G_{SE}$, add edge (START,z) with edge label <0,0> to $G_{SE}$.
5. (a) Compute $T_L$, a lower bound on the time required for a single iteration of L.
   (b) For each unmarked loop-carried edge (x, y) in G with edge label <k,q>:
      (i) compute edge lower bounds $T_1$ and $T_2$;
      (ii) Mark (x,y). If k is less than or equal to $T_1+T_2+(q-1)T_L$, then go to step 5(b);
      (iii) add edge (START, y) with edge label <$k_1$,0> where $k_1=\lfloor T_1+0.5(q-1)T_L \rfloor$, and add edge (x, END) with edge label <$k_2$,0> to $G_{SE}$, where $k_2=k-k_1$.
6. Use the Rank Method or some other scheduling method on $G_{SE}$ and halt.

Optimizing for a Single Loop-Carried Dependence

For this case, only a single loop-carried dependence edge is allowed to be the special edge using a measure to determine which edge will be made special. The schedule with the smallest completion time of all the schedules that are computed is selected as the final schedule.

Choosing the Special Edge

After constructing $G_{SE}$ as described above, a special edge is selected. This edge is the loop-carried edge of G that is going to be optimized. There are a couple of approaches that can be used to choose the special edge. One is to choose the loop-carried dependence edge with the largest value of k/q, i.e., the largest latency per iteration. A second is to choose the loop-carried dependence edge that has the largest value when the computed lower bounds $T_1$, $T_2$, and $T_L$ are subtracted from its latency as follows. Let (x,y) with edge label <k,q> be the selected special edge, and let $T_L$ be the computed lower bound on the processing time of L. If $T_1$ and $T_2$ are the lower bounds for (START,y) and (x, END) computed by the method given in Section 4, then the special edge has a maximum value of $k-[T_1+T_2+(q-1)T_L]$ for all loop-carried edges in G. Intuitively, (x,y) is the edge with the largest "unaccounted for" latency.

Computing Latency Values

Let (x', y') in G with edge label <k',q'> be the special edge. Edge (START, y') is given a latency of j and edge (x', END) is given a latency of k'-j in $G_{SE}$. One approach is to iterate over all values of j from 0 to k'. However, if k' is large, or if the time spent in optimizing L is to be reduced, a binary search heuristic that greedily decides to halve or double j on the basis of the completion times of the schedules obtained for the two values can be used. In either case, values of j are eliminated such that the lower bound computation implies that either more than j cycles must occur between START and y', or more than k'-j cycles must occur between x' and END.
1. Construct $G_{SE}$ as described above.
2. Select special edge (x', y') in G with edge label <k', q'>.
3. Iterate over the value of k' in selecting the values of $k_1$ and $k_2$ in $G_{SE}$ for (START, y) and (x, END) respectively, calling the Rank Method or some other scheduling method on $G_{SE}$ for each new set of values for $k_1$ and $k_2$.
4. Select the minimum completion time schedule and halt.

Optimizing for Multiple Loop-Carried Dependences

For this case, more than one loop-carried dependence edge is allowed to be the special edge using a measure to determine which edges will be made special. The schedule with the smallest completion time of all the schedules that are computed is selected as the final schedule. The time spent on optimization increases as we consider more edges. If we have m edges with latencies $k_1'\ldots k_m'$, then the worst case execution time will be $O(k_1'\times\ldots\times k_m'\times F)$ where F is the execution time for a single call to the scheduling method, e.g., $F=O(N\times E)$ for the Rank Method.

Eliminating Loop-carried Dependences

Computing Lower Bounds

Suppose that loop-carried dependence (x,y) has distance=q>1. To compute lower bounds on the number of cycles that must elapse between the execution of instruction x in iteration i and instruction y in iteration i+q, Procedure Loop_lower_bound($G_{SE}$) computes a lower bound $T_L$ for the execution of a single iteration of L.

Let $\pi = z_1, z_2, \ldots, z_m$ be a simple path in $G_{SE}$. The length of $\pi$ is the sum of the processing times of $z_2, z_3, \ldots, z_{m-1}$ plus the sum of the latencies on the edges $(z_r, z_{r+1})$, $1 \leq r < m$. Note that the processing times of the end points of the path are not included in the computation of the path length. A longest path between two nodes is a path with the greatest length.

One lower bound $T'_L$ is obtained by summing the execution times of all the instructions in L and dividing that figure by the number of functional units n. A second lower bound P is obtained by first computing the longest path between START and END. If the hardware does not have a look-ahead window, the longest path is a lower bound on the time of a single iteration. If the hardware does have a look-ahead window of size W, then the lower bound P is set to the (amortized) time of a single iteration which is the length of a longest path minus 2(W−1). The 2 is needed because instructions from two adjacent iterations might fill what would have been latency induced idle slots in the absence of the lookahead window. Procedure Loop_lower_bound ($G_{SE}$) returns $T_L = \max\{T'_L, P\}$.

Computing Rank as a Lower Bound

Given that loop-carried dependence (x,y) has distance= q>1, the Rank Method computation takes into account the nodes that must follow x in any schedule and the number of nodes that must precede y in any schedule, together with their associated processing times and, to some extent, their edge latencies. The rank(x) is computed as follows.

Procedure Backschedule is called on x, D, and $G_{li}$, and on y, −D, and $G_{li}$ (as START and END are not yet included in the processing). If D is less than or equal to zero, then the "inverse" rank of y ($\text{rank}^{-1}(y)$) is computed by reversing the direction of all edges in $G_{li}$ and setting D=−D, i.e., the non-negative value of D. If D is initially greater than zero, then neither D or the edges of $G_{li}$ are modified. The following description only discusses x, but the same description also holds for y in the graph in which the edges have been reversed, and the absolute value of D is used.

|D|31 rank⁻(x) is a lower bound on the number of cycles that must occur starting with the first predecessor of x before x can begin execution. T is initialized to 0, and every node in $G_{li}$ is given an artificial deadline of D. If x is a sink node, i.e., x has no descendants in $G_{li}$, then rank(x)=D. Otherwise, assume that the ranks of all of the descendants of x in $G_{li}$ have already been computed. A backschedule for x that contains all of the descendants of x is constructed as follows.

The descendants of x are ordered according to the length of their longest path from x, going from large to small. If z is a descendent of x, then z has an integral processing time p(z), and T is set equal to $\max\{T, k(z)+p(z)\}$, where k(z) is the length of the longest path from x to z. z is then "chopped" by dividing z into p(z) unit length pieces. The longest path from x to each piece of z is defined to be k(z) and each piece has the same rank as rank(z).

Suppose there are n functional units, $F_1, F_2, \ldots, F_n$. A backschedule B consists of n "simulated" functional units which are labelled $f_1, f_2, \ldots, f_n$, with $f_1$ corresponding to $F_i$. $B_x$ is the backschedule for $_x$.

In constructing $B_x$, pieces of z are placed only on functional units of the type that run the instruction represented by z. Such a functional unit is called acceptable for z. Pieces of the descendants of $_x$ are greedily placed in $B_x$, with each piece of z being placed only on functional units that are acceptable for z. The pieces that were obtained from the descendants of x are processed in list order, with each piece being started in $B_x$ at the latest possible slot that is not already occupied in $B_x$ such that the last piece completes at time D, and no piece completes later than its rank.

For each piece, the earliest start time of any piece of z in the backschedule minus the length of the longest path from x to that piece is computed. The rank(x) is the smallest such value. T is then set to max{T, D−rank(x)} and T is returned.

Let $T_L$ be the largest lower bound that is computed. To compute the lower bound on the number of cycles that must elapse between the execution of instruction x in iteration i and instruction y in iteration i+q, compute $T_L \times (q-1) + T_1 + T_2$. If this value is at least as great as k, edge (x,y) can be eliminated. Otherwise, Procedure Process_edge((x,y), $T_1$, $T_2$, $G_{SE}$) is called which computes $k_1 = \lfloor (T_L \times (q-1))/2 + T_1 \rfloor$ and $k_2 = k - k_1$. It then adds edge (START,y) with edge label <$k_1$,0> and edge (x, END) with edge label <$k_2$,0> to $G_{SE}$. Procedure Process_edge then returns $G_{SE}$.

Preferred Embodiment

Figure 8:
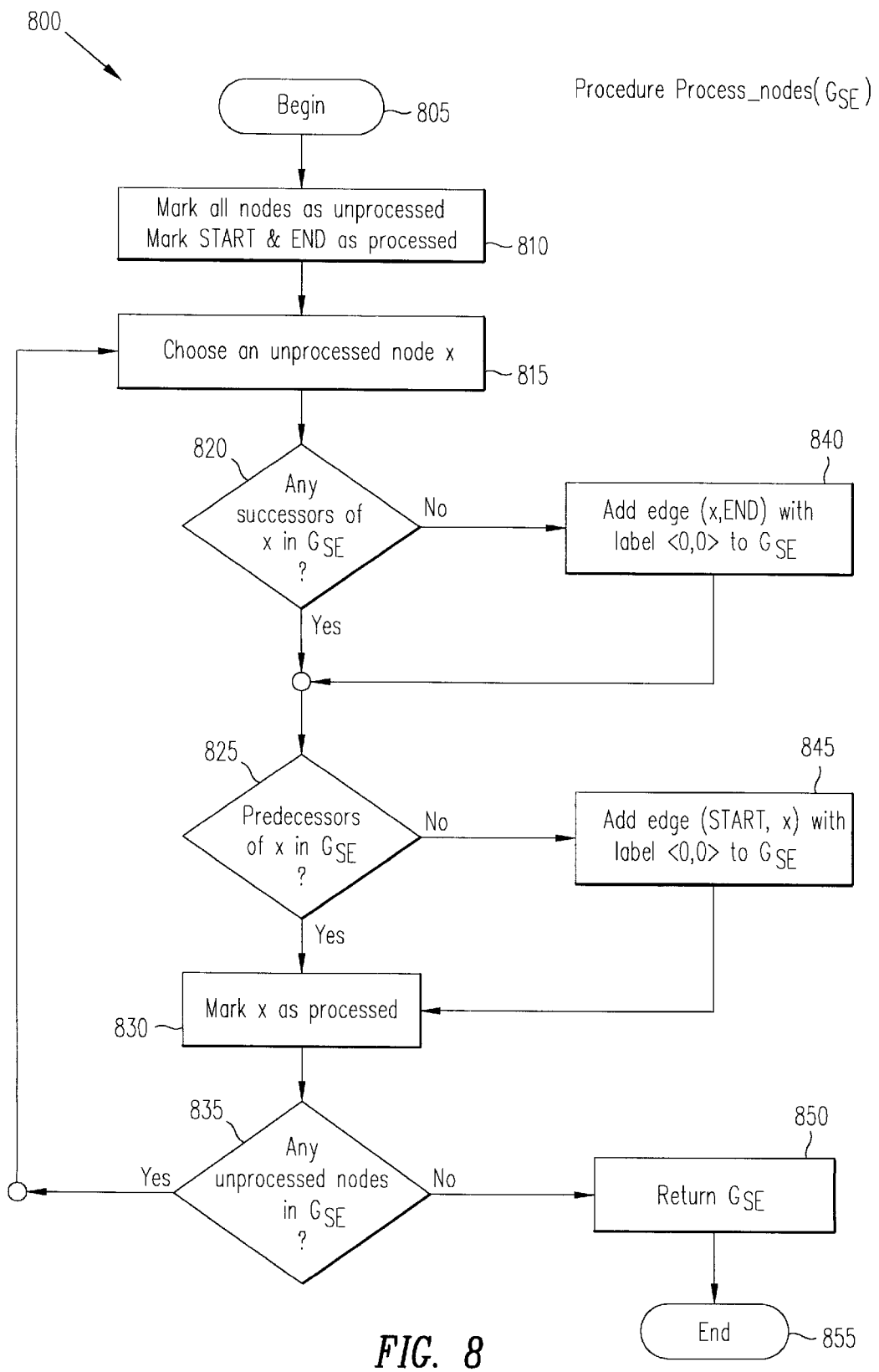
FIG. 8 is a flowchart illustrating the operations preferred in carrying out the Procedure Process_nodes($G_{SE}$) portion of the present invention.
Figure 9:
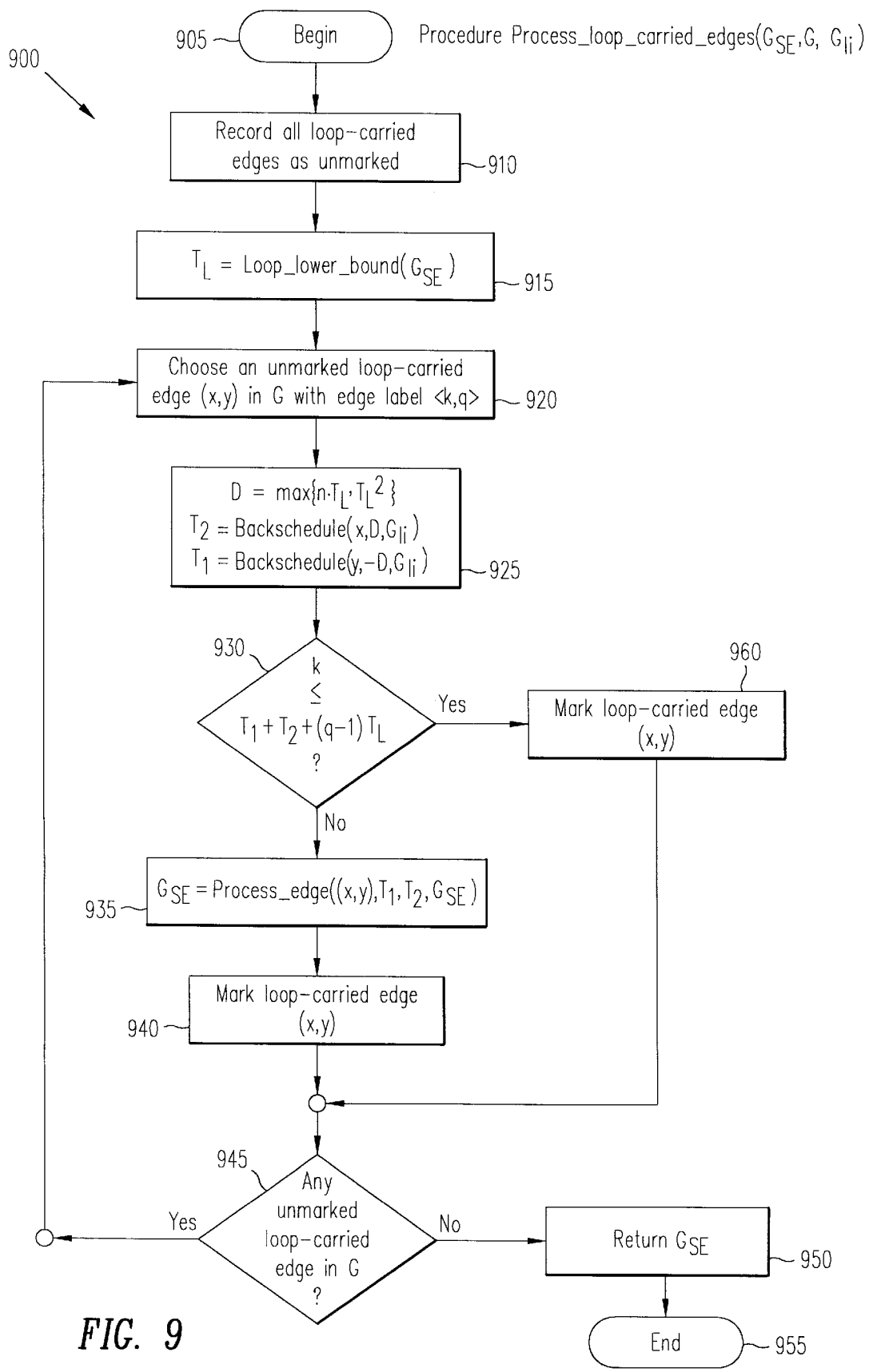
FIG. 9 is a flowchart illustrating the operations preferred in carrying out the Procedure Process_loop_carried_edges ($G_{SE}$, G, $G_{li}$) portion of the present invention.
Figure 11:
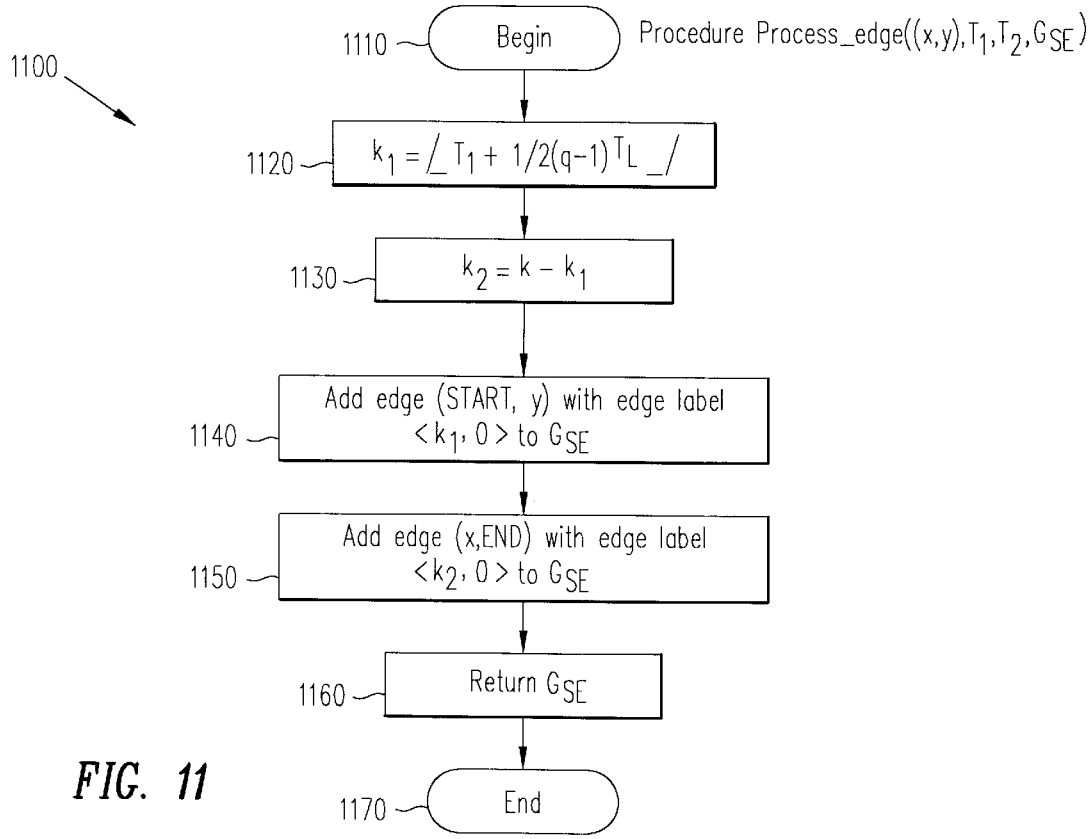
FIG. 11 is a flowchart illustrating the operations preferred in carrying out the Procedure Process_edge((x,y),$T_1$,$T_2$, $G_{SE}$) portion of the present invention.
Figure 12:
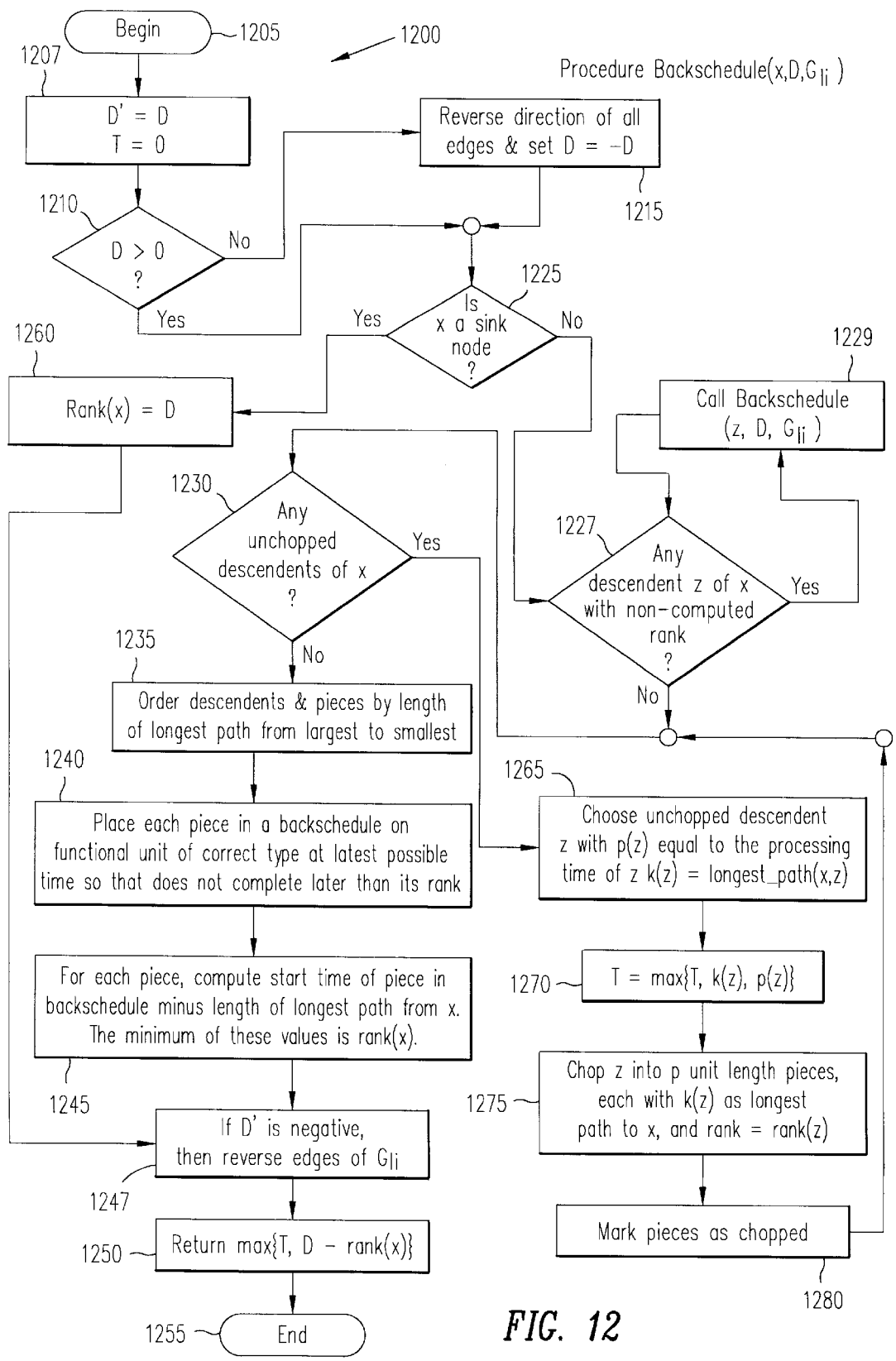
FIG. 12 is a flowchart illustrating the operations preferred in carrying out the Procedure Backschedule(x,D,$G_{li}$) portion of the present invention.

The operations preferred in carrying out the present invention may be implemented as seven routines or programs comprising a main procedure, Procedure Process_nodes($G_{SE}$), Procedure Process_loop_carried_edges($G_{SE}$, G, $G_{li}$), Procedure Loop_lower_bound($G_{SE}$), Procedure Process_edge((x,y), $T_1$, $T_2$, $G_{SE}$), Procedure Backschedule (x,D, $G_{li}$), and Procedure Rank_Method. The main procedure, illustrated in FIG. 7, determines an optimal instruction schedule for a loop that satisfies all data dependences and minimizes the completion time of the entire loop. The Procedure Process_nodes($G_{SE}$), illustrated in FIG. 8, is called by the main procedure to identify source nodes and sink nodes and to add loop-independent edges. The Procedure Process loop_carried_edges($G_{SE}$, G, $G_{li}$), illustrated in FIG. 9, is called by the main procedure to eliminate loop carried edges and replace others with loop-independent edges. The Procedure Loop_lower_bound($G_{SE}$), illustrated in FIG. 10, called by Procedure Process_loop_carried_edges($G_{SE}$, G, $G_{li}$) to compute a lower bound on the time required for a single iteration of a loop. The Procedure Process_edge((x,y), $T_1$, $T_2$, $G_{SE}$), illustrated in FIG. 11, is called by Procedure Process_loop_carried_edges($G_{SE}$, G, $G_{li}$) to add "representative" edges. Procedure Backschedule (x,D,$G_{li}$) illustrated in FIG. 12, is called by Procedure Process_loop_carried_edges($G_{SE}$, G, $G_{li}$) to compute backschedules. Procedure Rank_Method, described in Palem et al. which is incorporated herein by reference, is called by Procedure Process_loop_carried_edges($G_{SE}$, G, $G_{li}$) to produce instruction schedules.

Referring next to FIG. 7 through FIG. 12, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill in the art to write code in any suitable computer programming language.

Figure 7:
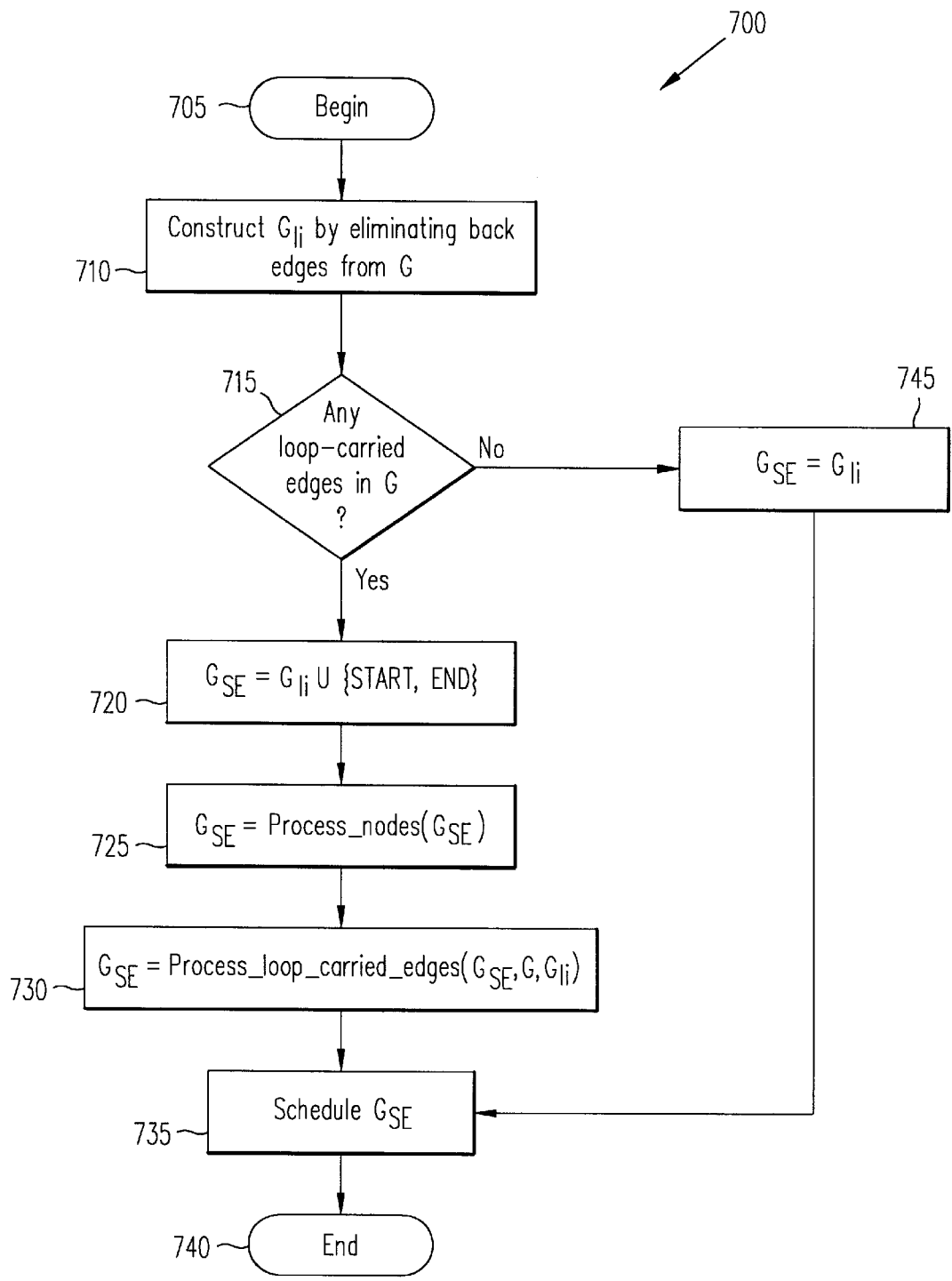
FIG. 7 is a flowchart illustrating the operations preferred in carrying out the present invention.

Referring now to FIG. 7, the process of the invention, generally referred to as 700, begins at process block 705. Thereafter, process block 710 produces $G_{li}$ by eliminating backedges from G. Thereafter, decision block 715 determines if there are any loop-carried edges in G. If there are any loop-carried edges in G, then process block 720 assigns the union of $G_{li}$ and {START, END} to $G_{SE}$, and then process block 725 calls Process_nodes($G_{SE}$) which adds edges from all sink nodes to END and from START to all source nodes of $G_{li}$, and returns $G_{SE}$. Thereafter, process block 730 calls Process_loop_carried_edges($G_{SE}$,G,$G_{li}$) which replaces all loop carried edges (x,y) with edges (START,y) and (x,END) and returns $G_{SE}$. Thereafter, process block 735 schedules $G_{SE}$, and then the process ends at process block 740.

Returning now to decision block 715, if there are not any loop-carried edges in G, then process block 745 assigns $G_{li}$ to $G_{SE}$, and then processing continues to process block 735 to schedule $G_{SE}$.

Referring now to FIG. 8, the Procedure Process_nodes ($G_{SE}$), generally referred to as 800, is called by process block 725 of FIG. 7. The Procedure Process_nodes($G_{SE}$) 800 begins at process block 805, and then process block 810 marks all nodes as unprocessed and marks START and END as processed. Thereafter, process block 815 chooses an unprocessed node x, and decision block 820 determines if x has any successors. If x has any successors, then decision block 825 determines if x has any predecessors. If x has any predecessors, then process block 830 marks x as processed, and then decision block 835 determines if there are any unprocessed nodes in $G_{SE}$. If there are any unprocessed nodes in $G_{SE}$, then processing loops back to process block 815 to process another unprocessed node in $G_{SE}$.

Returning now to decision block 820, if x has no successors, then process block 840 adds an edge (x,END) with label <0,0> to $G_{SE}$, and then processing continues to decision block 825 to determine if x has any predecessors.

Returning now to decision block 825, if x has no predecessors, then process block 845 adds an edge (START, x) with label <0,0> to $G_{SE}$, and then processing continues to decision block 835 to determine if there are any unprocessed nodes in $G_{SE}$.

Returning now to decision block 835, if there are no unprocessed nodes in $G_{SE}$, then process block 850 returns $G_{SE}$, and then the process ends at process block 855.

Referring now to FIG. 9, the Procedure Process_loop_carried_edges($G_{SE}$, G, $G_{li}$), generally referred to as 900, is called by process block 730 of FIG. 7. The Procedure Process_loop_carried_edges($G_{SE}$, G, $G_{li}$) 900 begins at process block 905, and thereafter, process block 910 records all loop-carried edges as unmarked. Process block 915 then calls Procedure Loop_lower_bound($G_{SE}$) and assigns the result to $T_L$. Thereafter, process block 920 chooses an unmarked loop-carried edge (x,y) in G with edge label <k,q>. Process block 925 sets D to a large number relative to the value of $T_L$ (D>>$T_L$ such that all ranks are nonnegative, for example D=$T_L^2$ or D=n×$T_L$), and then calls Procedure Backschedule(x,D,$G_{li}$), and assigns the result to $T_2$. Process block 925 next sets D to −D, calls Procedure Backschedule(y,D,$G_{li}$), and assigns the result to $T_1$. Thereafter, decision block 930 determines if k is less than or equal to [$T_1$+$T_2$+(q−1)$T_L$]. If k is not less than or equal to [$T_1$+$T_2$+(q−1)$T_L$], then process block 935 calls Procedure Process_edge((x,y),$T_1$,$T_2$,$G_{SE}$) and assigns the result to $G_{SE}$. Process block 940 then marks loop-carried edge (x,y), and decision block 945 determines if there are any unmarked loop-carried edges in G. If there is an unmarked loop-carried edge in G, then processing loops back to process block 920 to process another unmarked loop-carried edge (x,y) in G with edge label <k,q>.

Returning now to decision block 930, if k is less than or equal to [$T_1$+$T_2$+(q−1)$T_L$], then process block 960 marks loop-carried edge (x,y), and then processing continues to decision block 945 to determine if there are any unmarked loop-carried edges in G.

Returning now to decision block 945, if there is no unmarked loop-carried edge in G, then processing continues to process block 950 to return $G_{SE}$.

Figure 10:
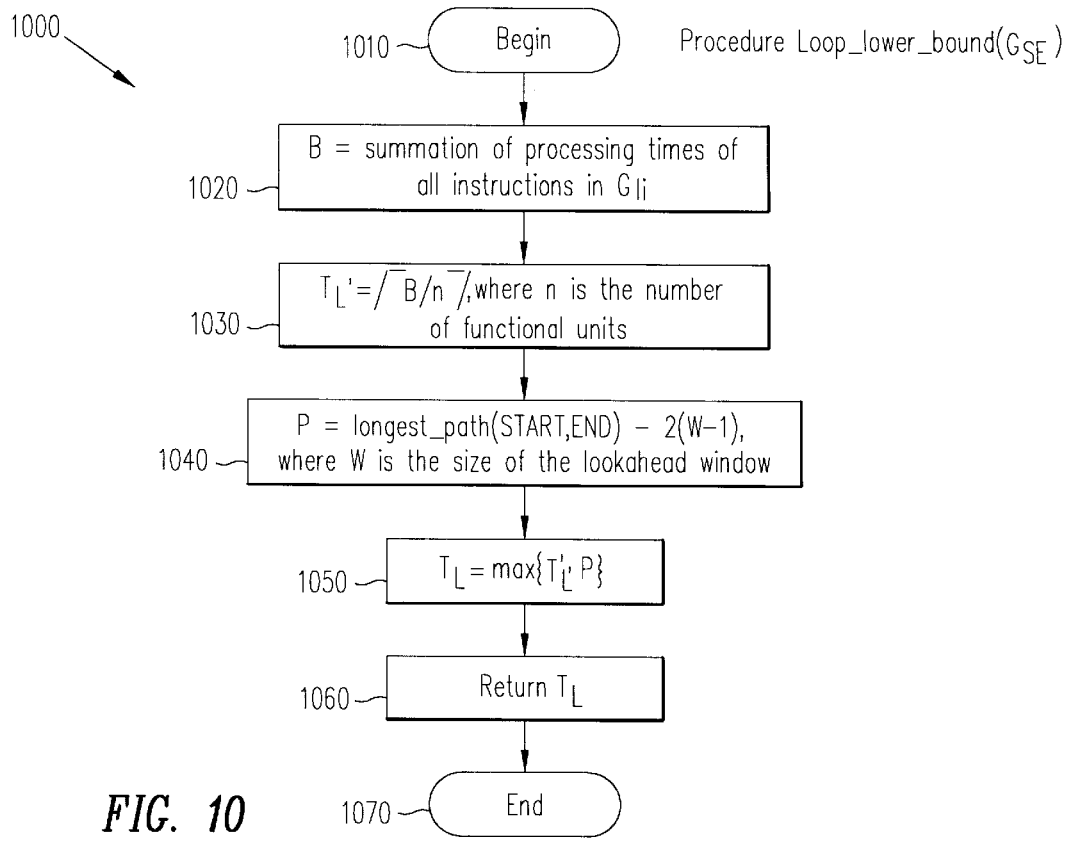
FIG. 10 is a flowchart illustrating the operations preferred in carrying out the Procedure Loop_lower_bound($G_{SE}$) portion of the present invention.

Referring now to FIG. 10, the Procedure Loop_lower_bound($G_{SE}$), generally referred to as 1000, is called by process block 915 of FIG. 9. The Procedure Loop_lower_bound($G_{SE}$) 1000 begins at process block 1010, and then process block 1020 sums the processing times of all instructions in $G_{li}$ and assigns the result to B. Thereafter, process block 1030 sets $T_L'$ equal to [B/n], where n is the number of functional units. Process block 1040 then sets P equal to Longest_path(START,END)−2(W−1), where W is the size of the lookahead window. Thereafter, process block 1050 sets $T_L$ equal to max{$T_L'$,P}, and process block 1060 returns $T_L$. Thereafter, the process ends at process block 1070.

Referring now to FIG. 11, the Procedure Process_edge ((x,y), $T_1$, $T_2$, $G_{SE}$), generally referred to as 1100, is called by process block 935 of FIG. 9. The Procedure Process_edge((x,y), $T_1$, $T_2$,$G_{SE}$) 1100 begins at process block 1110, and then process block 1120 sets $k_1$ equal to ⌊_$T_1$+½(q−1) $T_L$_⌋, and process block 1130 sets $k_2$ equal to k−$k_1$. Thereafter, process block 1140 adds edge (START,y) with edge label <$k_1$, 0> to $G_{SE}$, and process block 1150 adds edge (x,END) with edge label <$k_2$,0> to $G_{SE}$. Process block 1160 then returns $G_{SE}$, and the process ends at process block 1170.

Referring now to FIG. 12, the Procedure Backschedule (x,D,$G_{li}$), generally referred to as 1200, is called by process block 935 of FIG. 9. The Procedure Backschedule(x,D,$G_{li}$) 1200 begins at process block 1205, and thereafter process block 1207 sets D' equal to D, and initializes T to 0. Decision block 1210 then determines if D is greater than zero. If D is greater than zero, then processing continues to decision block 1225. If D is not greater than zero, then process block 1215 reverses the directions of all edges and sets D=−D. Thereafter, decision block 1225 determines if x is a sink node. If x is not a sink node, then decision block 1227 determines if there is any descendent z of x whose rank is not yet computed. If there is a descendent z of x whose rank is not yet computed, then process block 1229 calls Procedure Backschedule (z, D, $G_{li}$), and then loops back to decision block 1227.

Returning now to decision block 1227, if there is not any descendent z of x whose rank is not yet computed, then decision block 1230 determines if there are any unchopped descendents of x. If there are not any unchopped descendents of x, then process block 1235 orders descendents and pieces by length of longest path from largest to smallest, and process block 1240 places each piece in a backschedule on a functional unit of correct type at a latest possible time so that each piece does not complete later than its rank. Thereafter, process block 1245 computes, for each piece, a start time of the piece in a backschedule minus the length of the longest path from x (as computed in process block 1265), where the minimum of these values is rank(x). Thereafter, if D' is negative, then process block 1247 reverses the edges of $G_{li}$. Process block 1250 then returns max{T, D−rank(x)}, and the process ends at process block 1255.

Returning now to decision block 1225, if x is a sink node, then process block 1260 sets rank(x) equal to D, and then processing continues to process block 1247.

Returning now to decision block 1230, if there are any unchopped descendents of x, then process block 1265 chooses an unchopped descendent z with p(z) equal to the processing time of z, and sets k(z) equal to longest_path (x,z). Process block 1270 then sets T equal to max{T, k(z), p(z)}. Thereafter, process block 1275 chops z into p unit length pieces, each with k(z) as longest path to x, and rank=rank(z), and process block 1280 marks the pieces as chopped. Thereafter, processing loops back to decision block 1230 to determine if there are any more unchopped descendents of x.

System and/or Computer Program

Figure 13:
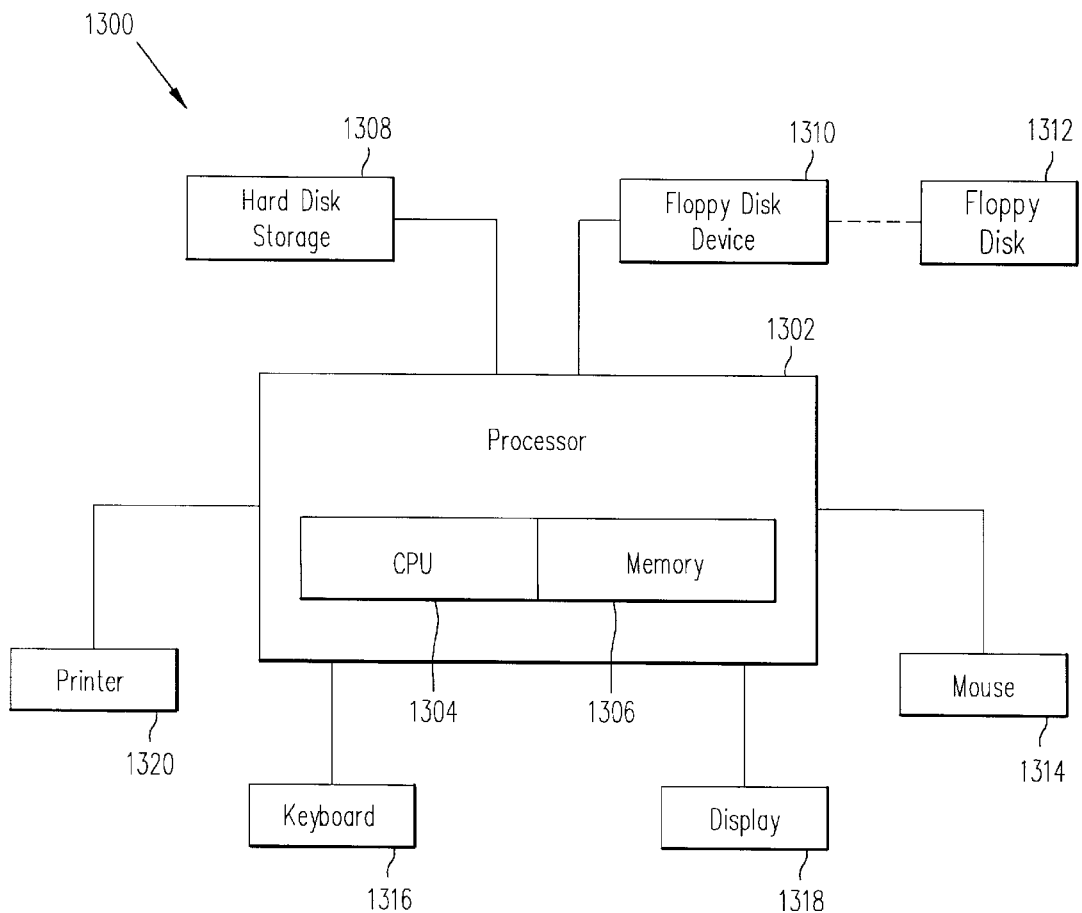
FIG. 13 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 13, a block diagram illustrates a computer system 1300 used in performing the method of the present invention, forming part of the apparatus of the present invention, and which may use the article of manufacture comprising a computer-readable storage medium having a computer program embodied in said medium which may cause the computer system to practice the present invention. The computer system 1300 includes a processor 1302, which includes a central processing unit (CPU) 1304, and a memory 1306. Additional memory, in the form of a hard disk file storage 1308 and a computer-readable storage device 1310, is connected to the processor 1302. Computer-readable storage device 1310 receives a computer-readable storage medium 1312 having a computer program embodied in said medium which may cause the computer system to implement the present invention in the computer system 1300. The computer system 1300 includes user interface hardware, including a mouse 1314 and a keyboard 1316 for allowing user input to the processor 1302 and a display 1318 for presenting visual data to the user. The computer system may also include a printer 1320.

Although the present invention has been particularly shown and described with reference to a preferred embodiment, it will be understood by those skilled in the art that various changes in form and detail may be made without departing from the spirit and the scope of the invention.

We claim:

1. A method of scheduling a plurality of instructions of a loop for execution by a processor having a lookahead buffer, said method comprising the steps of:
   constructing a dependence graph comprising nodes and edges corresponding to the loop;
   constructing a loop-independent dependence graph by removing a loop-carried edge from the dependence graph; and
   scheduling the instructions for execution based on the loop-independent dependence graph.

2. The method of claim 1, further comprising the steps of:
   adding an additional node representing a loop iteration to the loop-independent dependence graph; and
   adding a loop-independent edge between the additional node and another node of the dependence graph.

3. The method of claim 2, further comprising the steps of:
   adding a start node simulating a previous iteration of the loop to the loop-independent dependence graph; and
   adding a loop-independent edge between a source node and the start node.

4. The method of claim 2, further comprising the steps of:
   adding an end node simulating a next iteration of the loop to the loop-independent dependence graph; and
   adding a loop-independent edge between a sink node and the end node.

5. The method of claim 2, further comprising the step of:
   eliminating, from the loop-independent dependence graph, loop-carried edges which satisfy a computed lower bound on a time required for a single loop iteration.

6. The method of claim 2, further comprising the step of:
   replacing a loop-carried edge which does not satisfy a computed lower bound on a time required for a single loop iteration by a pair of loop-independent edges.

7. A method of scheduling a plurality of instructions of a loop for execution by a processor having a lookahead buffer, said method comprising the steps of:
   constructing a dependence graph comprising nodes and edges corresponding to the loop;
   constructing a loop-independent dependence graph by removing a loop-carried edge from the dependence graph;
   adding an additional node representing a loop iteration to the loop-independent dependence graph;
   adding a loop-independent edge between the additional node and another node of the dependence graph;
   eliminating, from the loop-independent dependence graph, loop-carried edges which satisfy a computed lower bound on a time required for a single loop iteration;
   replacing a loop-carried edge which does not satisfy a computed lower bound on a time required for a single loop iteration by a pair of loop-independent edges; and
   scheduling the instructions for execution based on the loop-independent dependence graph.

8. A computer system for scheduling a plurality of instructions of a loop for execution by a processor having a lookahead buffer, said system comprising:
   a dependence graph comprising nodes and edges corresponding to the loop;
   a loop-independent dependence graph constructed by removing a loop-carried edge from the dependence graph; and
   a scheduler for scheduling the instructions for execution based on the loop-independent dependence graph.

9. The computer system of claim 8 further comprising:
   an additional node representing a loop iteration added to the loop-independent dependence graph; and
   a loop-independent edge between the additional node and another node of the dependence graph.

10. The computer system of claim 9 wherein:
    the additional node is a start node simulating a previous iteration of the loop; and
    the loop-independent edge is between a source node and the start node.

11. The computer system of claim 9 wherein:
    the additional node is an end node simulating a next iteration of the loop; and
    the loop-independent edge is between a sink node and the end node.

12. The computer system of claim 9 wherein loop-carried edges which satisfy a computed lower bound on a time required for a single loop iteration are eliminating from the loop-independent dependence graph.

13. The computer system of claim 9 wherein a loop-carried edge which does not satisfy a computed lower bound on a time required for a single loop iteration is replaced by a pair of loop-independent edges.

14. A computer system for scheduling a plurality of instructions of a loop for execution by a processor having a lookahead buffer, said system comprising:
    a dependence graph comprising nodes and edges corresponding to the loop;
    a loop-independent dependence graph constructed by removing a loop-carried edge from the dependence graph;

an additional node representing a loop iteration added to the loop-independent dependence graph;

a loop-independent edge between the additional node and another node of the dependence graph;

a computed lower bound on a time required for a single loop iteration, such that loop-carried edges which satisfy the computed lower bound are eliminated from the loop-independent dependence graph, and such that a loop-carried edge which does not satisfy the computed lower bound is replaced by a pair of loop-independent edges; and a scheduler for scheduling the instructions for execution based on the loop-independent dependence graph.

15. An article of manufacture for use in a computer system for scheduling a plurality of instructions of a loop for execution by a processor of said computer system, said processor having a lookahead buffer, said article of manufacture comprising a computer-readable storage medium having a computer program embodied in said medium which causes the computer system to:

construct a dependence graph comprising nodes and edges corresponding to the loop;

construct a loop-independent dependence graph by removing a loop-carried edge from the dependence graph; and schedule the instructions for execution based on the loop-independent dependence graph.

16. The article of manufacture of claim 15 wherein said computer program may further cause the computer system to:

add an additional node representing a loop iteration to the loop-independent dependence graph; and add a loop-independent edge between the additional node and another node of the dependence graph.

17. The article of manufacture of claim 16, wherein said computer program further causes the computer system to:

add a start node simulating a previous iteration of the loop to the loop-independent dependence graph; and add a loop-independent edge between a source node and the start node.

18. The article of manufacture of claim 16, wherein said computer program further causes the computer system to:

add an end node simulating a next iteration of the loop to the loop-independent dependence graph; and add a loop-independent edge between a sink node and the end node.

19. The article of manufacture of claim 16 wherein said computer program further causes the computer system to:

eliminate, from the loop-independent dependence graph, loop-carried edges which satisfy a computed lower bound on a time required for a single loop iteration.

20. The article of manufacture of claim 16, wherein said computer program further causes the computer system to:

replace a loop-carried edge which does not satisfy a computed lower bound on a time required for a single loop iteration by a pair of loop-independent edges.

21. An article of manufacture for use in a computer system for scheduling a plurality of instructions of a loop for execution by a processor of said computer system, said processor having a lookahead buffer, said article of manufacture comprising a computer-readable storage medium having a computer program embodied in said medium which causes the computer system to:

construct a dependence graph comprising nodes and edges corresponding to the loop;

construct a loop-independent dependence graph by removing a loop-carried edge from the dependence graph;

add an additional node representing a loop iteration to the loop-independent dependence graph;

add a loop-independent edge between the additional node and another node of the dependence graph;

eliminate, from the loop-independent dependence graph, loop-carried edges which satisfy a computed lower bound on a time required for a single loop iteration;

replace a loop-carried edge which does not satisfy a computed lower bound on a time required for a single loop iteration by a pair of loop-independent edges; and schedule the instructions for execution based on the loop-independent dependence graph.

* * * * *